US012771804B2

(12) United States Patent
Field et al.

(10) Patent No.: US 12,771,804 B2
(45) Date of Patent: *Oct. 20, 2026

(54) SYSTEM AND METHOD FOR MULTI-MODAL MICROSCOPY

(71) Applicant: Theia Scientific, LLC, Arlington, VA (US)

(72) Inventors: Christopher Field, Arlington, VA (US); Kevin Field, Arlington, VA (US)

(73) Assignee: Theia Scientific, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/014,473

(22) Filed: Jan. 9, 2025

(65) Prior Publication Data

US 2025/0150548 A1 May 8, 2025

Related U.S. Application Data

(63) Continuation of application No. 17/718,805, filed on Apr. 12, 2022, now Pat. No. 12,231,802.

(60) Provisional application No. 63/229,290, filed on Aug. 4, 2021.

(51) Int. Cl.
*H04N 5/265* (2006.01)
*G06T 7/30* (2017.01)
*G11B 27/10* (2006.01)

(52) U.S. Cl.
CPC ............... *H04N 5/265* (2013.01); *G06T 7/30* (2017.01); *G11B 27/10* (2013.01); *G06T 2207/10016* (2013.01); *G06T 2207/10056* (2013.01); *G06T 2207/20084* (2013.01)

(58) Field of Classification Search
None
See application file for complete search history.

(56) References Cited

U.S. PATENT DOCUMENTS 10,467,754 B1 11/2019 Ando et al.
10,935,773 B2 3/2021 Johnson et al.
2017/0206420 A1 7/2017 She et al.
(Continued)

FOREIGN PATENT DOCUMENTS

CN 111340061 A 6/2020
EP 1821483 A1 8/2007
(Continued)

OTHER PUBLICATIONS

Notification of Transmittal of the International Search Report and the Written Opinion issued on Aug. 16, 2022 in corresponding International Application No. PCT/US22/24985; 9 pages.
(Continued)

*Primary Examiner* — Heather R Jones
(74) *Attorney, Agent, or Firm* — Maier & Maier, PLLC

(57) ABSTRACT

A system and method for processing multi-modal microscopy imaging data on small-scale computer architecture which avoids restrictive manufacturer data formats and APIs. The system and method leverage a web-based application made available to microscopy instrument control hardware by which direct visual output of the control hardware is captured and transmitted to an edge computing device for processing by one or more inference models in parallel to construct a composite hyperimage.

20 Claims, 8 Drawing Sheets

(56) References Cited

U.S. PATENT DOCUMENTS

| | | | |
|---|---|---|---|
| 2018/0137338 | A1 | 5/2018 | Kraus et al. |
| 2018/0173188 | A1 | 6/2018 | Poletto |
| 2018/0315190 | A1 | 11/2018 | Sasagawa et al. |
| 2018/0322327 | A1 | 11/2018 | Smith et al. |
| 2018/0322634 | A1 | 11/2018 | Zimmerman et al. |
| 2019/0108418 | A1 | 4/2019 | Coven et al. |
| 2019/0171897 | A1 | 6/2019 | Merai et al. |
| 2019/0220702 | A1 | 7/2019 | Wshah et al. |
| 2019/0303706 | A1 | 10/2019 | Tizhoosh et al. |
| 2020/0013172 | A1 | 1/2020 | Shibuya et al. |
| 2020/0026575 | A1 | 1/2020 | Guim Bernat et al. |
| 2020/0090305 | A1 | 3/2020 | El-Khamy et al. |
| 2020/0265243 | A1 | 8/2020 | Yan et al. |
| 2020/0372069 | A1 * | 11/2020 | Pearlman ............ G06F 16/9566 |
| 2020/0372643 | A1 | 11/2020 | Esposito |
| 2021/0150701 | A1 | 5/2021 | Thagaard et al. |
| 2021/0150779 | A1 | 5/2021 | Anastasio et al. |
| 2021/0151289 | A1 | 5/2021 | Schoenmakers et al. |
| 2021/0160434 | A1 | 5/2021 | Amthor et al. |
| 2021/0190664 | A1 | 6/2021 | Duke et al. |
| 2021/0192722 | A1 | 6/2021 | Brozek et al. |
| 2021/0192759 | A1 | 6/2021 | Lang |
| 2021/0201485 | A1 | 7/2021 | Chukka et al. |
| 2021/0209413 | A1 * | 7/2021 | Nakago ............... H01L 21/3065 |
| 2021/0209753 | A1 | 7/2021 | Dogdas et al. |
| 2021/0209758 | A1 | 7/2021 | Buckland et al. |
| 2021/0216746 | A1 | 7/2021 | Nie et al. |
| 2021/0216822 | A1 | 7/2021 | Paik et al. |
| 2021/0407080 | A1 | 12/2021 | Szu et al. |
| 2022/0027728 | A1 * | 1/2022 | Han ......................... G06N 3/09 |

FOREIGN PATENT DOCUMENTS

| | | | |
|---|---|---|---|
| JP | H10234110 | A | 9/1998 |
| JP | 2013105565 | A | 5/2013 |
| JP | 2017084108 | A | 5/2017 |
| JP | 2021015476 | A | 2/2021 |
| WO | 2019018693 | A2 | 1/2019 |
| WO | 2020050072 | A1 | 3/2020 |

OTHER PUBLICATIONS

Extended Search Report issued on May 20, 2025, in corresponding European Application No. 22851008.7, 17 pages.

Office Action issued on Apr. 22, 2025, in corresponding Japanese Application No. 2024-507179, 6 pages.

Office Action issued on Aug. 12, 2025, in corresponding Japanese Application No. 2024-507179, 7 pages.

* cited by examiner

SYSTEM AND METHOD FOR MULTI-MODAL MICROSCOPY

CROSS-REFERENCE TO RELATED APPLICATIONS

This application is a continuation of U.S. patent application Ser. No. 17/718,805, filed on Apr. 12, 2022, which claims priority from U.S. Provisional Patent Application No. 63/229,290, filed on Aug. 4, 2021, entitled "SYSTEM AND METHOD FOR MULTI-MODAL MICROSCOPY," the entire contents of which are hereby incorporated by reference.

This invention was made with government support under DE-SC0021529 awarded by the U.S. Department of Energy. The government has certain rights in the invention.

BACKGROUND

In the field of material science, and even microscopy in general, microscopes are an important tool for evaluating and probing for changes in the local structure and chemistry of a material. By examining these basic building blocks of a material, it is possible to better understand the relationships between macro and micro properties which result, both to guide research and development looking forward as well as to determine retrospectively why a material behaved or failed in the way it did.

While advances in electron microscope technology have revolutionized typical workflows and methodologies, these advances have also led to the creation of significantly larger quantities of data which must be evaluated in order to arrive at a useable result. Charge-coupled devices (CCDs), or computer-controlled image acquisition devices more generally, have replaced once labor-intensive processes with near point-of-acquisition image capture and have enabled real-time observation using these microscopes. Recent developments in multi-modal data acquisition, which gives rise to multidimensional image sets (or a hyperimage), have led to an exponential increase in the amount of available data one must process.

As a result, scientists have traded one bottleneck for another: time spent acquiring microscopy data for time spent analyzing said data. Analyzing this information is a labor-intensive task which can require a high degree of skill. Further, manual analysis is error- and bias-prone and does not scale well with modern instrumentation.

In response, practitioners have looked to artificial intelligence and machine learning in an attempt to automate the processing of these datasets, specifically deep convolutional neural networks (CNNs) and vision transformers (ViTs). The drawbacks of these efforts, however, lie in the significant amount of hardware and/or cloud-based computing resources necessary to execute these networks in order to effectively provide useable results.

While intriguing, solutions making use of CNNs and ViTs aren't practical given the real-world operating constraints of a typical laboratory. It is standard practice for laboratories to isolate equipment on networks which have no external Internet connection, which typically eliminates the ability to work with cloud-based systems in real-time entirely. The various proprietary systems and software required to operate these complicated microscopes also often result in datasets or file formats which have little to no portability—even between machines in the lab itself. Further still, nondisclosure agreements and the like make the use of cloud-based systems difficult or impossible, even if the technical hurdles were to be overcome.

Thus, a system and method is needed which is both practical and accessible to the averaged laboratory and which reduces the labor required to process the sizable datasets generated in modern microscopy.

SUMMARY

The present invention encompasses an artificial intelligence platform leveraging machine and computer vision to provide a scalable and accessible solution which decreases the amount of effort and personnel expertise needed to interpret and quantify microscopy images. The machine vision platform serves to host, deploy, and interface with feature labelling algorithms between stand-alone microscopes using computer hardware that is accessible to the typical laboratory.

Here, a server, preferably a web server, is used to interface with one or more microscopy instruments that are capable of providing real-time, single- or multi-modal microscopy data flows. The control hardware of each instrument, by executing a web-based application provided by the server, is able to provide one or more data streams which are captured directly from a physical or virtual display of the control hardware to the server. Each of these data flows are converted, by the client and/or the server, into a multiple modality workflow for processing with an artificial intelligence architecture, or a translation of artificial intelligence architecture, in order to conduct alignment and automated feature detection of the datasets so that the corresponding hyperimage(s) and/or visual and numerical quantifications may be generated. The workflow(s) are then combined and processed and presented in a readable form to a user.

Because of the manner in which these data flows are managed, it is possible to combine any number of datasets provided by any number of microscopy instruments, regardless of when the data was actually captured, to provide for real-time or pseudo-real time analysis of the specimen material. Previously captured datasets may be "played back" to be compared or used with datasets currently being captured in real-time, allowing for more comprehensive and flexible compound analyses to be conducted. Latency of various analysis models may be accounted for in order to avoid artificial bias or artifacts in the resulting hyperimage.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
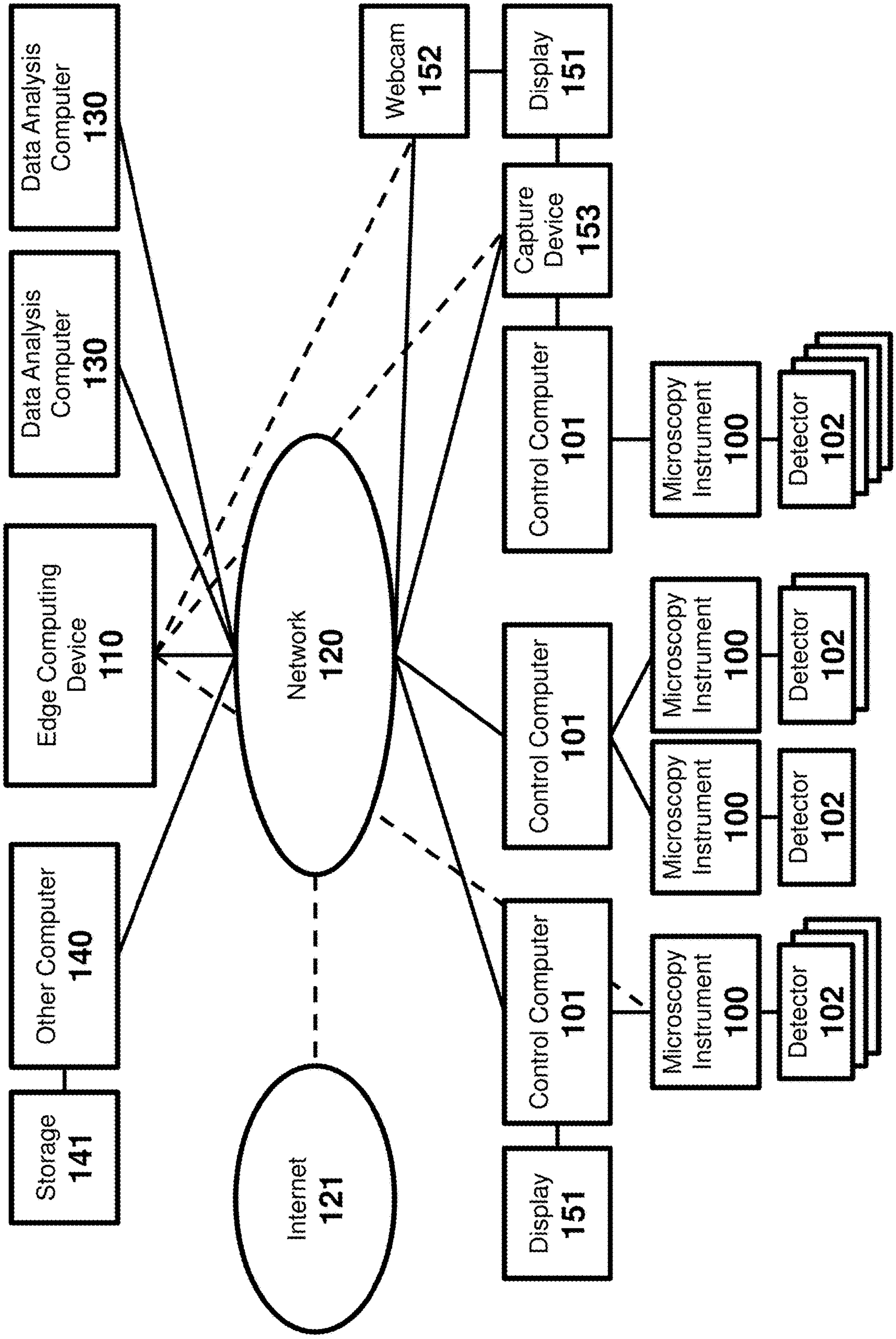
FIG. 1 is a schematic representation of a computer network which uses client-originated screen capture in order to obtain data from an instrument.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs), field programmable gate arrays (FPGA), etc.), by program instructions being executed by one or more processors, or by a combination of both. Additionally, sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Additionally, those embodiments pertaining to computer devices, computational devices, and the like may include desktop computers, laptop computers, servers, handheld devices, smartphones, tablets, PDAs, servers, cloud-based computing, and other electronic devices which comprise at least a processor and memory or storage for carrying out computational tasks and/or executing computer code.

A microscopy instrument 100 is a device which may be used to capture visual data of a specimen or target material using a variety of imaging techniques and technologies. Such devices may include, but are not limited to, visual light microscopes, white or spectral light microscopes, infrared microscopes, electron microscopes, x-ray microscopes, infrared microscopes, and the like which may be used in conjunction with compound, stereoscopic, confocal, scanning, transmission, polarized, and reflection-based technologies in order to generate an image or a dataset which describes the specimen or target material.

However, the system and method described herein may also be applied to broader imaging schemes in general, including (but not limited to) the fields of astronomy, geology, medical imaging, spectroscopy, and video/home surveillance. For instance, the system and method may be used in conjunction with hyperspectral analyses, ground penetrating radar or similar technologies, X-ray devices, computed tomography (CT) scanners, magnetic resonance imaging (MRI) devices, mass spectrometers or spectrometers generally, and video cameras.

In the case of more complex microscopy devices, the microscopy instrument is typically accompanied by a control computer 101 which includes the requisite processors, memory, storage, and hardware connections for interfacing with the microscopy instrument 100 and for executing software programs and user interfaces which control the microscopy instrument and retrieve data from the microscopy instrument. Control computers 101 may allow an end-user to review data feeds and conduct analysis on the control computer 101 hardware itself through the use of display technologies and the like, or the control computer 101 may be operated in a "headless" fashion through a network connection with another computational device whereupon data analysis is conducted.

Often times, commercially available microscopy devices are run using proprietary software or protocols. This proprietary software may or may not involve licensing or similar digital rights management (DRM) elements, which are tied to and/or may restrict functionality of the software and/or microscope. This proprietary software is typically required to run and control the microscope 100, capture and generate data outputs, and/or conduct off-microscope tasks such as data analysis, evaluation, and the like. Software and protocols tend to vary between manufacturers, resulting in little to no consistency with respect to application programming interfaces (APIs), file formats, and the like. This lack of consistency may exist even when a user is fully licensed and/or authorized to utilize the proprietary software or otherwise has full access to the proprietary software.

It should also be noted that each microscopy instrument 100 may contain one or more detectors 102 for the collection of imaging data. Imaging data collected from one or more detectors may be viewable as isolated or singular data streams or viewable as composited data streams combining imaging data from any number or combination of detectors 102. Multiple microscopy instruments 100 may also be combined together or grouped as a single instrument, generating data either in parallel or in a serial fashion.

In order to overcome these hurdles, and as shown schematically in FIG. 1, one or more edge computing devices 110 may be connected to the one or more control computers 101 over a network 120 for the purpose of supplementing or replacing analysis tools of the control computers 101, circumventing the restrictions of APIs and/or data formats, and/or more generally overcoming aspects of the proprietary software which are difficult or cumbersome to work with. The network 120 may contain external connections 121 such as to the Internet or the like, or the network may be isolated from external connections 121. The network 120 may also be connected to one or more dedicated data analysis computers 130. The network 120 may be wired or wireless, or a combination of both. The network may utilize any of the following technologies or protocols, alone or in combination: local, personal, and wide area network (or similar) technologies, Ethernet, serial connections, Wi-Fi, Bluetooth, ZigBee, Z-Wave, cellular connections, and the like.

Each edge computing device 110 is equipped with appropriate processors, memory, and storage which are capable of executing one or more computational models or inference models. Preferably, the edge computing device 110 includes a graphics processing unit (GPU) or similar highly parallelized processing unit which is capable of executing the one or more computational models in a parallelized manner, however the models may also be executed using normal computer processing units (CPUs), tensor processing units (TPUs), and the like without limitation. Each edge computing device 110 is configured to receive one or more video and/or data streams from the microscopy instruments 100, the control computers 101, and/or the data analysis computers 130 through the network 120 in order to parse the streams using computational models in order to provide an output. This output may be viewed directly on the edge computing device 110 by an end-user, though preferably the output is passed to a dedicated data analysis computer 130 or a control computer 101.

The video and/or data streams 161 received by the edge computing devices 110 may originate in the microscopy instruments themselves 100, may arise as outputs or data analyses conducted with or by protocols and algorithms of the control computers 101 based on images captured by the microscopy instruments 100, may arise from protocols or algorithms of the data analysis computer 130 in response to any of the foregoing, and may arise from direct input or manipulation by users of any of the foregoing.

The video and/or data streams 161 may also originate from storage devices 141 in any of the edge computing devices 110, data analysis computers 130, control computers 101, or other computational devices 140 connected to the network in the form of recorded or stored video, data, and/or processed analyses. These recorded streams reflect or correspond to imaging data or analyses which were captured either simultaneously with, substantially simultaneously to, or previously to an ongoing or real-time analysis. Here, "substantially simultaneously" means that the data is effectively captured in real-time accounting for latency, lag, or delays incurred by computational and network hardware in the collection, transmission, receipt, and processing of the appropriate data signals.

Recorded data streamed and/or processed in this fashion may be parsed either at an original speed or in an original timeframe, or this recorded data may be time-shifted, time-scaled, or subject to similar transformations in order to reflect, match, or otherwise be compatible with those timings and/or scales of an ongoing or real-time analysis and/or another recorded analysis. This time-shifting/scaling allows for more comprehensive hyperimages to be generated. Playback of data streams from their raw or "as-recorded" format, rather than relying solely on their final, processed form, also allows these recorded data streams to undergo the same processing, analyses, and registration as those real-time streams being analyzed, which is advantageous when these processes are configured to be conducted in parallel and/or using machine learning algorithms. However, in some instances, it may be preferable to pass on recorded data streams in their final, processed form. Data may also be streamed in both compressed and uncompressed formats, such as JPEG, MPEG, RAW and other compression schemes or raw data formats known in the art, with the relevant compression and decompression taking place on the respective devices.

In order to generate the video and/or data streams from the microscopy instruments 100 and/or the control computers 101, the control computers are preferably configured to be able to access a web-based application 160 provided through the network 120 by a server and/or hosted via an edge computing device 110 or near-edge computing device in a first step S1. The edge computing device 110 or near-edge computing device (or devices) may also be configured as the server or as a local micro-server. The web-based application 160 is configured to conduct data capture.

Typical compatibility concerns may be avoided due to the portability of web-based applications, servers, and the like. Accordingly, web-based applications may be easily implemented on most computers given the ubiquity of web browsers. In those embodiments in which the network 120 is isolated from the Internet or networks external to a laboratory, web browsers may still be used to access servers, web-based applications, and the like stored and/or provided locally on the network 120.

It is also conceivable that the edge computing device 110 also serves as the control computer 101, or the control computer 101 serves as the edge computing device 110, when appropriate system permissions and access are available. The data analysis computer 130 may be combined with the control computer 101 and/or the edge computing device 110 in a similar fashion. Accordingly, the vision system of the present invention may be executed locally on a single computational device which is configured to execute any combination of those roles performed by the control computer 101, edge computing device 110, and data analysis computer 130 described herein. When these roles are merged into this single device, those communications and/or transmission of video and/or data streams 161 normally taking place through the network 120 would take place within the single device between the relevant processes, programs, and/or hardware units instead.

Figure 2:
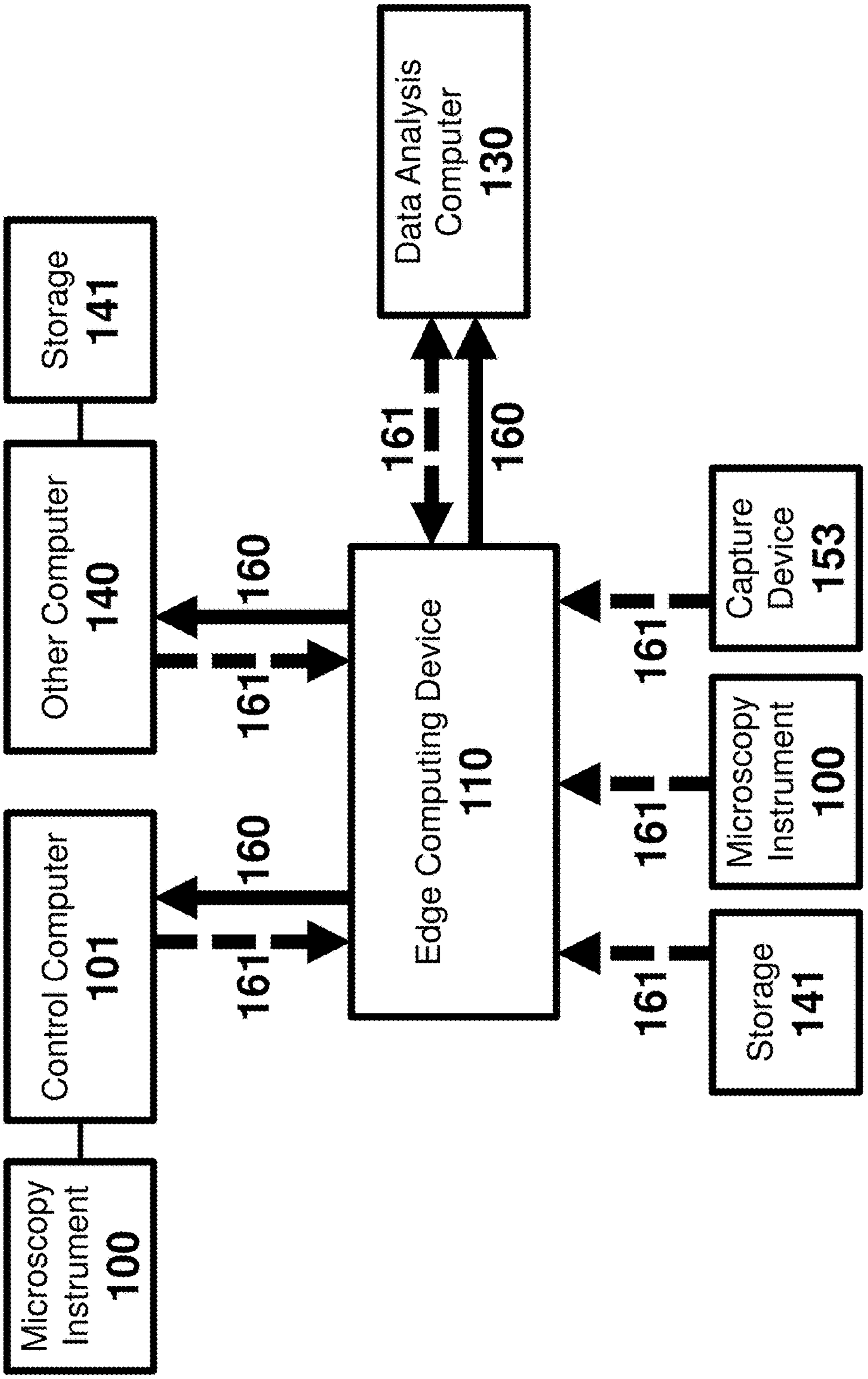
FIG. 2 is a schematic representation of data flows through a computer network which uses client-originated screen capture in order to obtain data from an instrument.

Turning to FIG. 2, a simplified schematic representation of one possible embodiment of the communications between the edge computing device 110, control computers 101, and other components of the network 120 are displayed to highlight the manner in which the web-based application 160 is served and video and/or data streams 161 received. Note that the linkages in FIG. 2 do not necessarily represent, describe, or otherwise serve to limit the precise path—through or past the network 120—these communications/transmissions take, as possible embodiments for such paths are exemplified in greater detail in FIG. 1. Likewise, the number of components—for example, the number of data analysis computers 130—depicted in FIG. 2 is exemplary and otherwise not intended to limit the total number of such devices which may communicate in the manner shown.

In addition to web-based applications, other means by which software hosted externally to the control computers 101 may be delivered to and executed by the control computers 101—even in those instances in which a given control computers 101 is access controlled or configured to have a locked-down computing environment—are also contemplated, including (but not limited to) remote desktop protocols, secure shell protocols, telnet protocols, and the like. Such connections may be encrypted or unencrypted.

The web-based application 160 is configured to, in a second step S2, capture, in an appropriate data format, a screen 150 of the control computer 101 and the information displayed thereon, thereby acquiring the data recorded by the control computer without needing to convert or parse proprietary or otherwise inconsistent file standards. This format may be as a still image, a series of still images, or a video feed. The entire screen 150 of the control computer may be captured at once and processed at a later step to derive regions of interest, or one or more individual regions of interest of the control computer screen may be captured. Note that "screen" here is not necessarily limited to the accompanying physical display device(s) 151 of the control computer 101 (such as a computer monitor, LCD/LED screen, tablet or phone screen, and the like), but may also include virtually constructed/configured screens or virtual displays within the control computer as configured by the appropriate display drivers or software of the control computer 101.

It is also contemplated that the screen capture of the control computer 101 may also be performed through alternative means, such as the use of webcams 152 directed at a display monitor of the control computer and processed by another computing device. Video capture devices 153, capture cards, splitters, adapters, or the like may also be connected in-line with or in place of a display output of the control computer, with or instead of the native display cables or infrastructure of the control computer, so that the video output of the control computer may be copied, split, or otherwise diverted to another computing device for processing. The other computing device in this case may be the edge or near-edge computing devices, data analysis computing devices, or a further dedicated video processing computing device.

Regions 154 of a screen 150 of the control computer 101 captured by the web-based application 160 may include direct feeds or outputs from microscopy instruments 100 or sensors connected to the control computer 101, or these regions may include pre-processed, composite, intermediate, or final data feeds derived from images or data captured by the connected microscopy instruments 100 which has been processed and/or parsed by the manufacturer's software, protocols, or algorithms already present on the control computer 101. Another potential embodiment may include the direct connection of sensors and detectors of the microscopy instrument 100 to the edge computing device 110.

The one or more captured regions, or screens 150, of the control computer 101 are then transmitted to the edge computing device 110, either directly or through another component of the network 120, to be processed.

It is important to note that data captured by the multiple microscopy instruments 100, or even multiple sensors or detectors 102 within a given microscopy instrument 100, often result in image fields which do not typically overlap exactly with one another in a manner which allows for direct comparison. This may be true even if the sensors or detectors 102 are precisely calibrated. Additionally, screen-capture methods employed by the web-based application 160 and/or the nature of external capture devices 153, webcams 152, and the like may introduce further distortions or imprecision into the image feeds which may inhibit meaningful direct comparisons. Therefore, each image or dataset must be properly cropped, scaled, and/or transformed in an analysis task in order to directly or substantially correspond to the other captured images. If not, feature recognition or feature correlations between images lose cohesion. Such a problem is exacerbated when attempting to build three-dimensional images from the captured microscopy data and multiple fields of view become involved.

Figure 3:
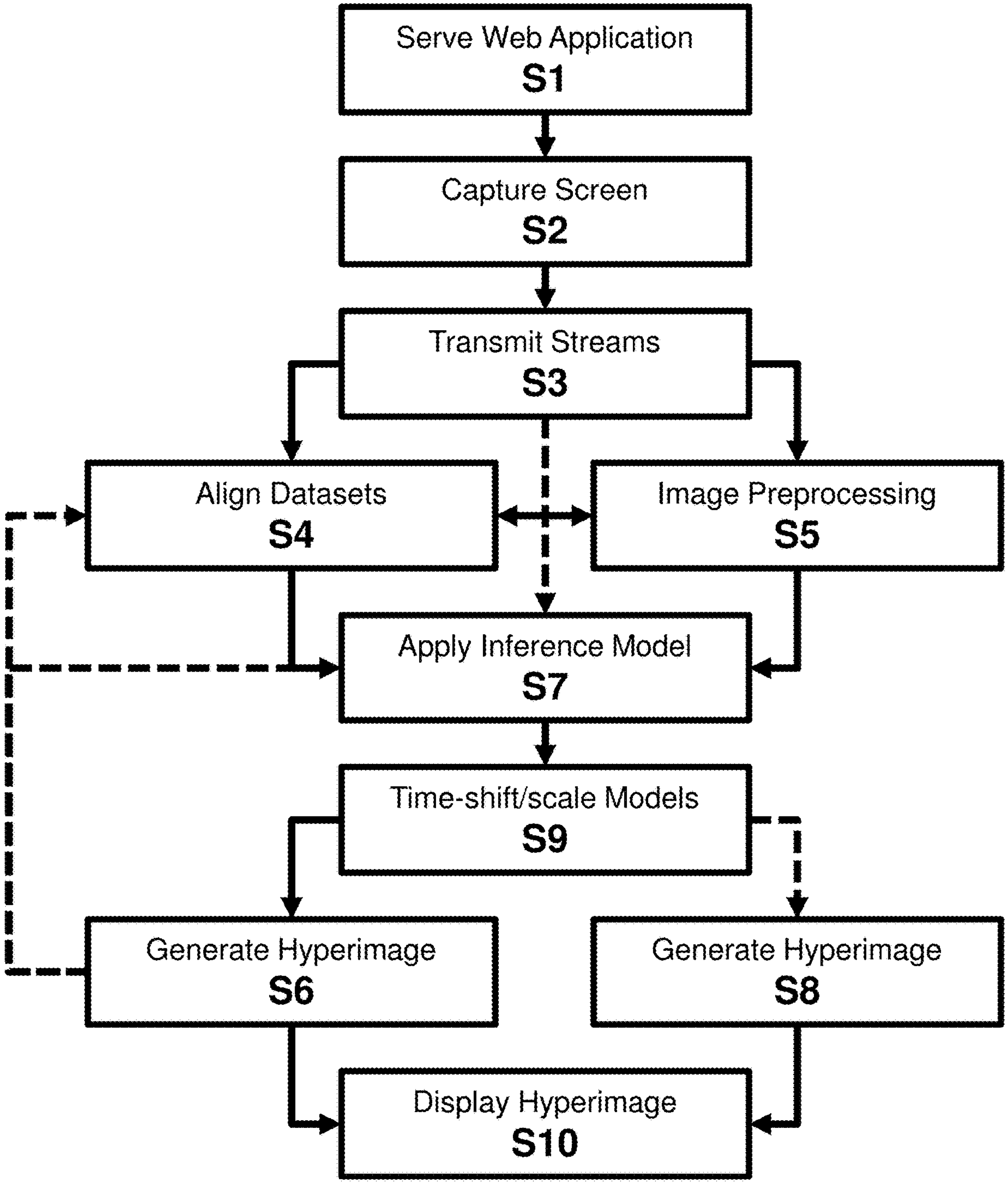
FIG. 3 is an exemplary sequence by which client-originated screen capture is used to obtain data from an instrument.

Turning now to FIG. 3, an exemplary sequence for creating and analyzing a hyperimage is shown.

In order to construct the final hyperimage, the edge computing device 110 is configured to receive, in a third step S3 the one or more data or video streams 161, conduct the necessary transformations in order to align the datasets in a fourth step S4 and/or conduct image preprocessing and/or feature/object detection according to a selected inference model or models in a fifth step S5, and to conduct registration of the inferred datasets to generate a final hyperimage in a sixth step S6. It is understood that steps S1-S6 highlighted above, and steps S7-S10 described below may be performed in any order and/or with the omission of steps, particularly given the number of devices and data streams involved as well as those preferred embodiments in which parallel computing is employed.

One or more inference models may be applied to each stream, or to a combination of streams in a seventh step S7. A first hyperimage may be used in conjunction with the one or more data streams and be similarly processed to generate a second hyperimage in an eighth step S8. Resulting hyperimages may include inference results from the one or more inference models in addition to numerical data. The process performed by the edge computing device 110 may be conducted serially, in which each image stream undergoes an analysis step in serial before proceeding to a final registration step, or the process may be conducted in a parallel fashion. Namely, each image stream may be simultaneously processed via the analysis step in parallel before proceeding to the registration step, or each image stream may simultaneously undergo analysis and registration in parallel.

Inference models are preferably configured as convolutional neural networks, though other machine learning algorithms or methodologies such as deep learning, deep neural networks, artificial intelligence, statistical analysis, transformers, and machine vision algorithms may be used. Likewise, scale vector machines (SVM), principal component analysis (PCA), and multivariate analysis (MVA), clustering algorithms, and pattern matching algorithms may be used.

The edge computing device 110 may execute the machine learning model directly, or the edge computing device 110 may instead execute a translation, derivation, surrogate, simulated, or similar scaled-down and/or optimized version of a more comprehensive machine learning model that gives substantially similar effect using significantly fewer computing resources. A trained or established machine learning model may thus be optimized and compressed for deployment on computing hardware with lesser capabilities or which is more easily obtained than that used to train the original model. Accordingly, the edge computing device 110 may be advantageously configured with more reasonable or affordable computer hardware that is more widely or easily accessible to a laboratory.

While the platform is provided with a default set of inference models, it is advantageous to configure these inference models in a modular fashion such that additional models may be provided to and run by the platform. Such a modular design gives end-users greater flexibility in conducting analyses and deriving hyperimages.

Latency of various inference models may also be taken into account in generating the hyperimage, such that a first inference model may be slowed down, sped up, or otherwise transformed or adapted in a ninth step S9 to accommodate a second or more inference models which operate at a different speed or with a different latency—similar to that of time-shifted recorded data streams. Such accommodation is performed to avoid undue influence, artificial bias, or artifacts imparted on the hyperimage through registration or other analyses conducted with inconsistent provision of data. This allows for a more seamless, real-time hyperimage to be generated accurately from a variety of data sources and using a variety of inference models.

Once the hyperimage is generated, it may be viewed in a tenth step S10 directly on the edge computing device 110 by an end user, or may preferably be streamed to a dedicated data analysis computer 130 for viewing by the end-user. By adapting the computational models of the edge computing device 110, a real-time data feed may be provided to the end-user which makes use of a variety of data sources, enhancing the overall results and insights which might be achieved through analysis of the hyperimage. Accordingly, an end-user may spend less time manually aggregating results and more time engaging in the science enabled by this real-time generation.

Hyperimages are not limited to static, stationary, or singular images or data fields. Hyperimages may comprise a stream of images or data fields, a video, or other composite of one or more captured images or data fields. Hyperimages may reflect two-dimensional images or data fields, three dimensional images or data fields, or any combination of the two in conjunction with a time dimension. It is possible for hyperimages to therefore include any of 1D, 2D, 3D, and N-D datasets where N is any given number of dimensions in the original dataset or which arise through combination of data streams, datasets, and/or input hyperimages to create the output hyperimage.

Figure 4:
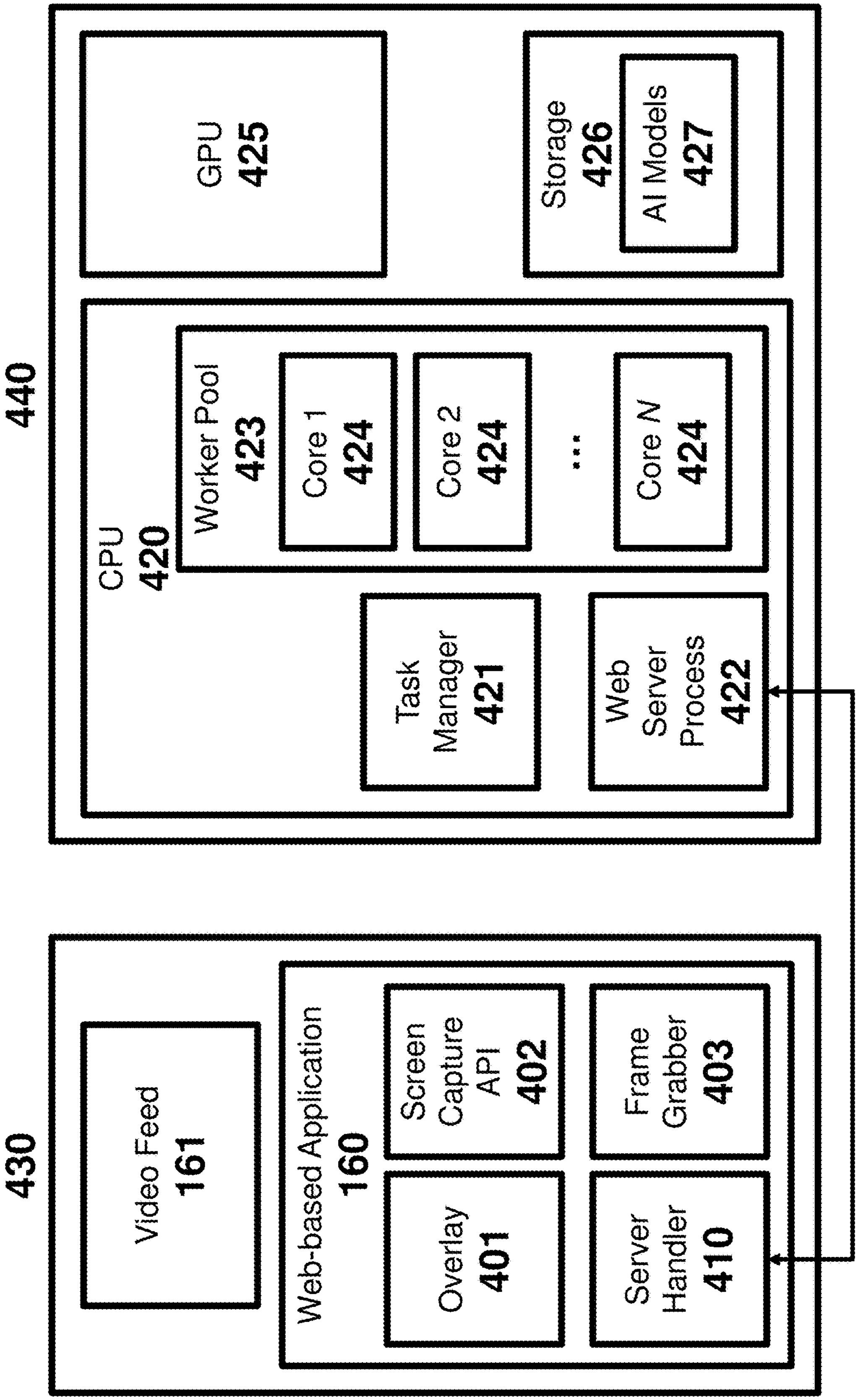
FIG. 4 is an exemplary embodiment of an analysis platform which uses CPU-based data analysis and originated screen capture to obtain data from an instrument.
Figure 5:
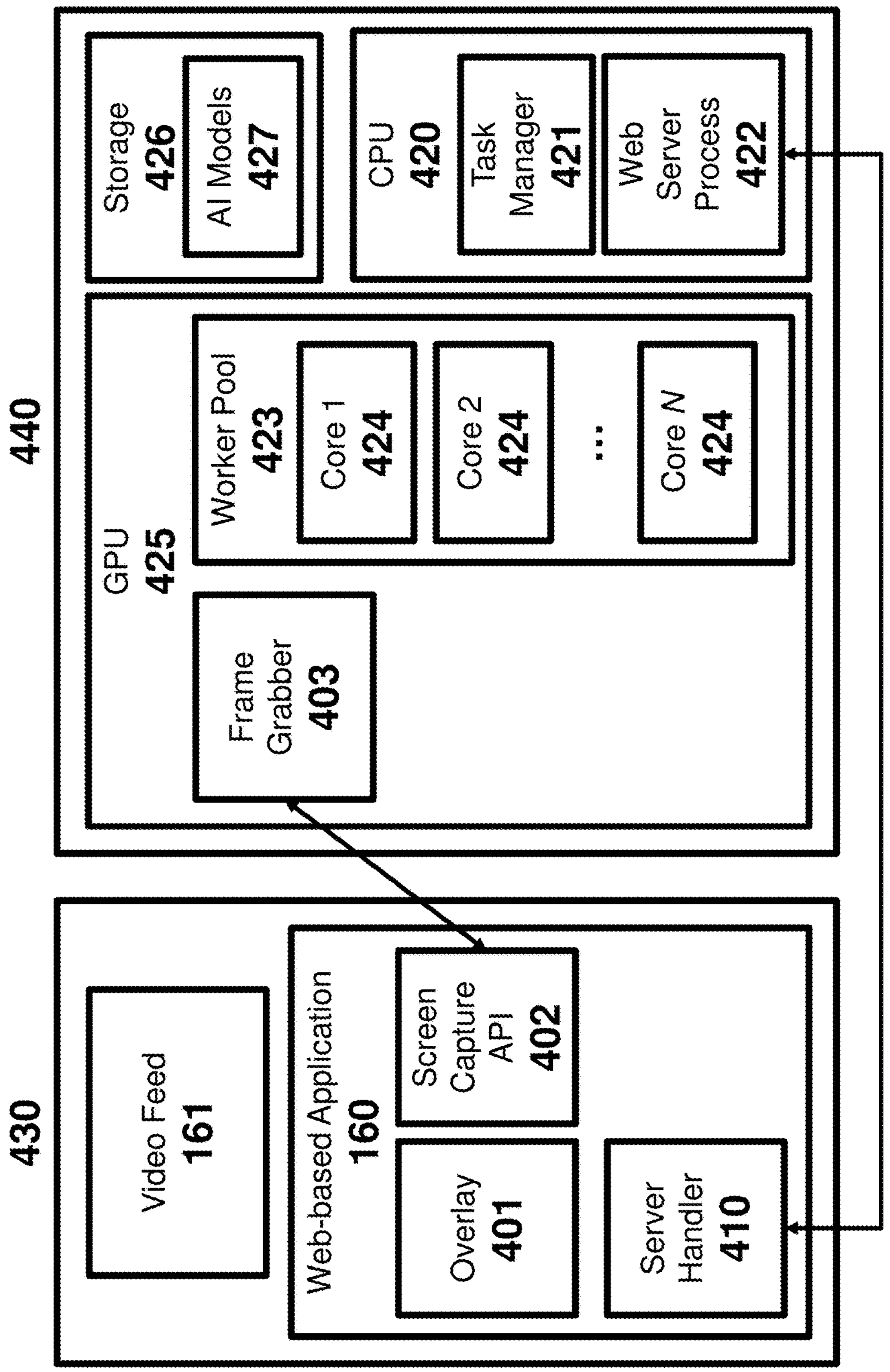
FIG. 5 is an exemplary embodiment of an analysis platform which uses GPU-based data analysis and originated screen capture to obtain data from an instrument.

FIGS. 4 and 5 show a client 430 in connection with a server 440. The client 430 may be embodied by, for example, the data analysis computer(s) 130, and the server 440 may be embodied by, for example, the edge computing device 110. Within client 430 is the video and/or data streams 161 as well as the web-based application 160 as received by the server 440. The web-based application includes computational units such as: a screen capture API 402 for interfacing with the client 430; an overlay 401 which might display over the video and/or data streams 161 or otherwise constitute information displayed to the screen 150 of the client 430; a frame grabber 403 for capturing the regions 154 of the screen 150; and a server handler 410 for providing a computational interface with the server 440. Likewise, the server 440 includes: a task manager 421 which manages computational tasks on the server 440, a web server process 422 which serves as a computational interface for any clients 430 connected to the server; a worker pool 423 comprising a plurality of cores 424 for carrying out computational tasks, and a storage 427 for storing artificial intelligence/machine learning models in the forms contemplated above.

FIG. 4 depicts an embodiment in which most computational tasks are carried out by a worker pool based on a CPU 420 of the server, the CPU 420 acting to both conduct data analysis as well as screen capture, however other CPUs in the network 120 may be used in addition to or instead of the server's 440 CPU 420. FIG. 5 depicts an embodiment in which these computational tasks are instead carried about by a worker pool 423 based on a GPU 425 of the server 440, the GPU 425 acting to conduct data analysis and/or screen capture. However, as above, other GPUs in the network 120 may be used in addition to or instead of the server's 440 GPU 425. FIG. 4 shows an embodiment in which the frame grabbing unit 403 is run natively on the client, whereas FIG. 5 shows an embodiment in which the frame grabbing unit is managed by the server 440.

FIGS. 4-6 depict further exemplary embodiments of analysis platforms using client-originated screen capture to obtain data from a microscopy instrument.

Further specific embodiments as highlighted in FIGS. 4-5 may include, in any combination: a web server process 422 that is based on or compatible with Hypertext Transfer Protocols (HTTP); a server handler 410 which operates or is otherwise coded using AJAX principles and techniques, WebSockets, or WebRTC protocols; a web-based application 160 may be configured using JavaScript or other "just-in-time" (JIT) compiled coding techniques which are compatible with delivery of web-based applications generally; and a frame grabber 403 which employs various video processing, encoding, and capture methods such as, for example, those available through FFmpeg.

Figure 6A:
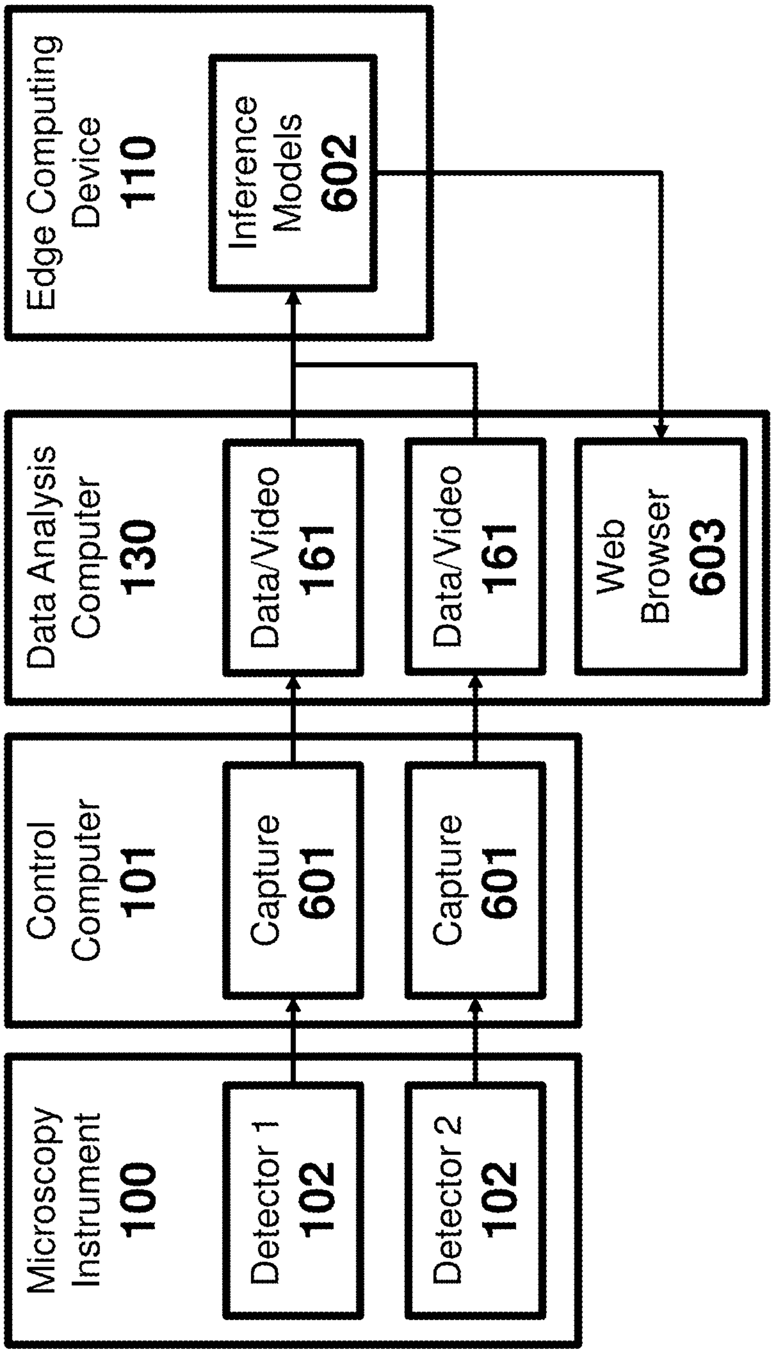
FIG. 6A is an exemplary embodiment of an analysis platform which can make use of asynchronous video capture by client-specific software.
Figure 6B:
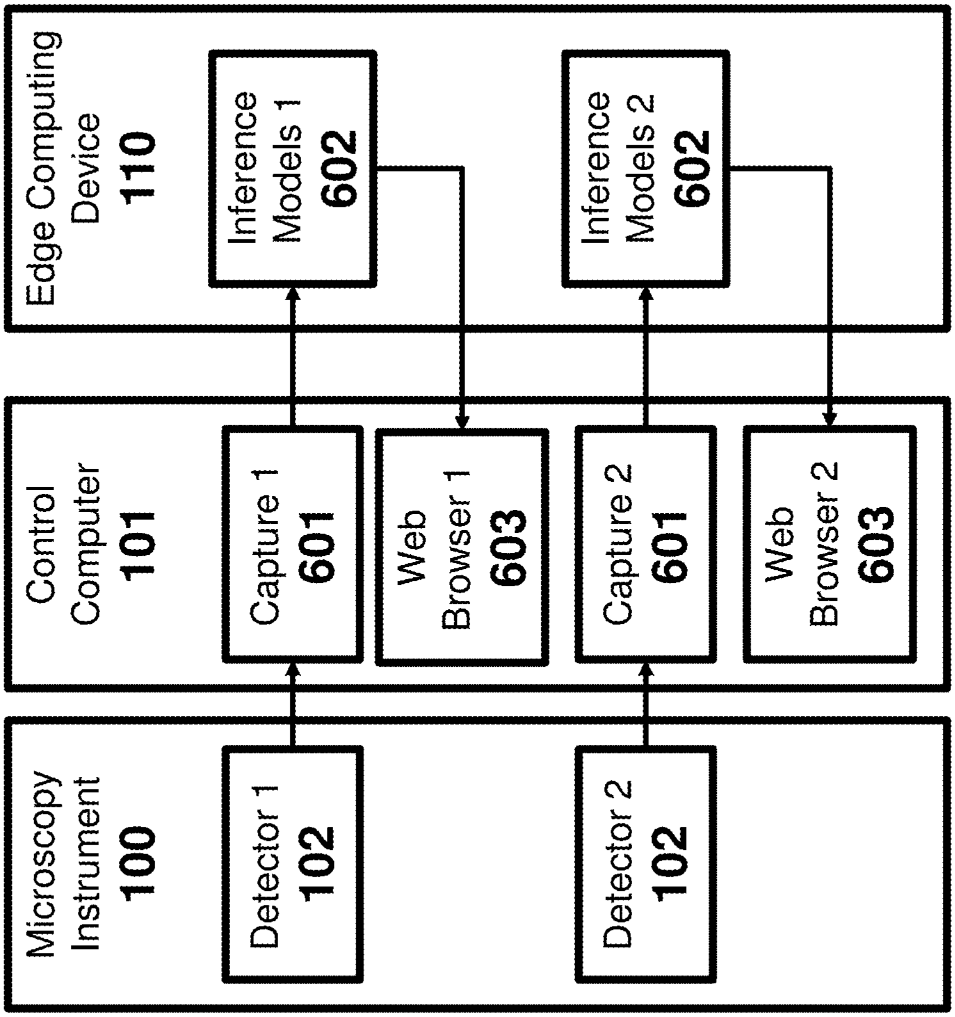
FIG. 6B is an exemplary embodiment of an analysis platform which uses client-originated screen capture to obtain data from and employs multiple inference models on one edge-computing device in real time.
Figure 6C:
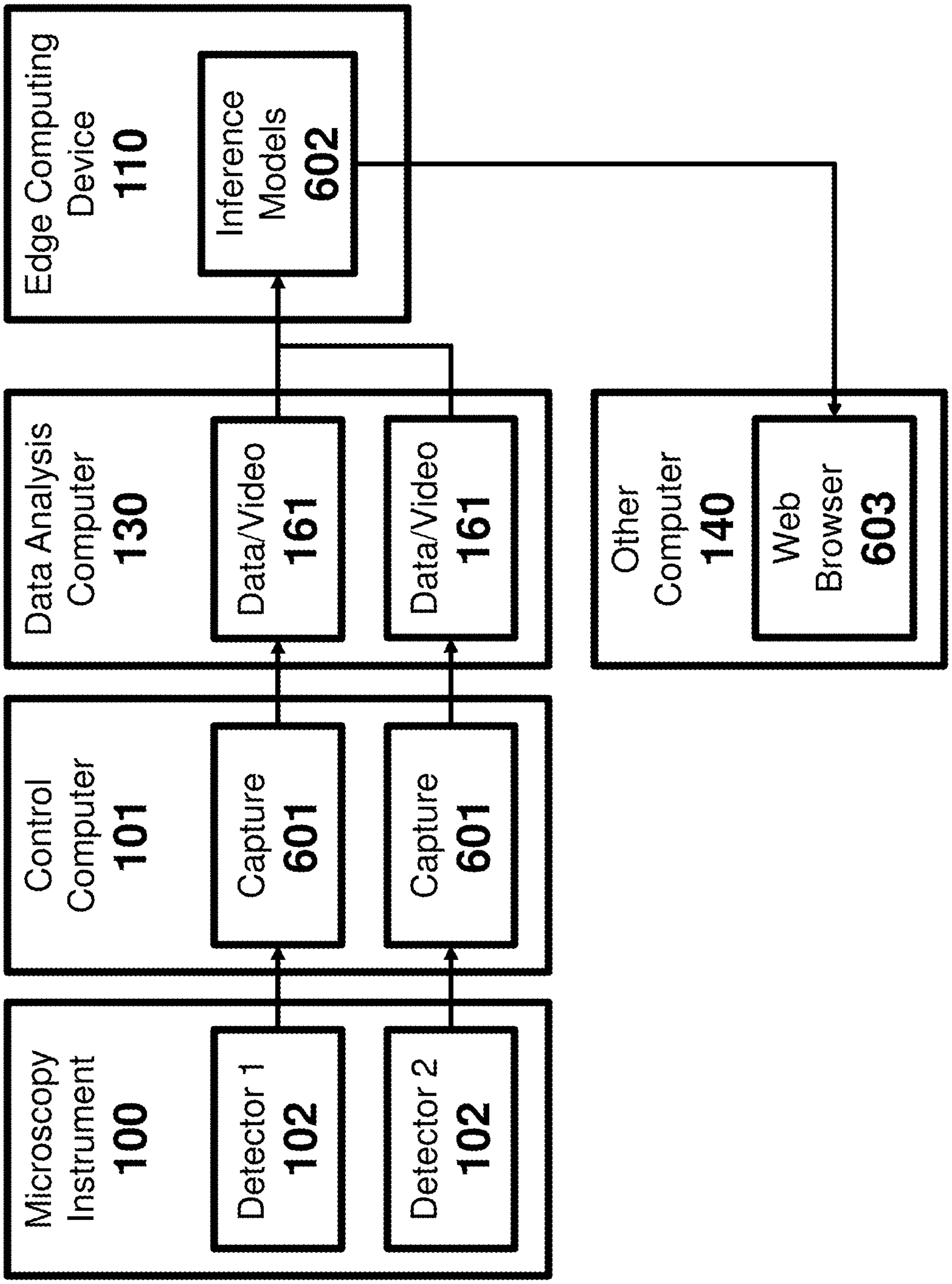
FIG. 6C is an exemplary embodiment of an analysis platform which uses client-originated screen capture to obtain data from an instrument, sharing to other displays which aren't directly connected to the instrument.

FIGS. 6A-6C depict exemplary arrangements of the computational systems.

In FIG. 6A, detectors 102 1 and 2 of the microscopy instrument pass data to a control computer 101 which, through data capture processes 601, pass these feeds through to the data analysis computer 130. The data analysis computer 130 passes these videos and/or data streams 161 on to the edge computing device 110 which then processes the video and/or data streams 161, applies one or more inference models 602, and then transmits the result back to the data analysis computer 130 so that the resulting hyperimages may be viewed through a web browser 603.

In FIG. 6B, highlighting only those differences from FIG. 6A for convenience, the data analysis computer 130 is omitted and the edge computing device 110 instead passes the video and/or data streams 161 back to the control computer 101. Notably in FIG. 6B, each video and/or data stream 161 is kept separate and processed through separate inference models 602 in the edge computing device 110 and displayed in separate web browsers 603 on the control computer 101.

In FIG. 6C, highlighting only those differences from FIG. 6A for convenience, instead of the results from the inference models 602 being passed back to the data analysis computer 130, these feeds are transmitted to and displayed in a web browser 603 of another computer device 140.

With or in addition to the foregoing embodiments, it should be noted that the analysis platforms may run one or more inference models 602 in series; may run one or more inference models 602 in series or parallel across multiple devices; and may run one or more inference models 602 on a single device, without limitation and in any combination.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention.

What is claimed is:

1. A system for processing imaging data into hyperimages, comprising:

at least one image capturing device, and at least one control computer, which has a display and which is connectable to the at least one image capturing device to operate the at least one imaging capturing device, wherein a first of at least one data stream comprises a screen capture of the at least one control computer, wherein the screen capture is retrieved while the at least one control computer is displaying imaging data captured by the at least one image capturing device, and wherein at least the screen capture of the first data stream is processed with at least one algorithm to construct a hyperimage.

2. The system according to claim 1, wherein the screen capture is retrieved by serving to the at least one control computer remotely-executable instructions.

3. The system according to claim 2, wherein the remotely-executable instructions are a web-based application.

4. The system according to claim 1, wherein the screen capture comprises at least part of a display of the at least one control computer.

5. The system according to claim 4, wherein the display comprises at least one of a physical display and a virtual display the at least one control computer.

6. The system according to claim 1, wherein the at least one data stream is a plurality of data streams, and a second of the plurality of data streams comprises previously recorded display information retrieved from a storage device.

7. The system according to claim 1, wherein the at least one data stream is a plurality of data streams, and the plurality of data streams are rendered consistent via at least one of: time shifting; time scaling; and latency correction of one or more of the plurality of data streams.

8. The system according to claim 1, wherein the at least one data stream is a plurality of data streams, and a third of the plurality of data streams comprises a webcam feed of a physical display of an additional control computer, the additional control computer being connected to at least one additional image capturing device and displaying imaging data captured by the at least one additional image capturing device.

9. The system according to claim 1, wherein the at least one algorithm is configured as a computer vision or image reconstruction algorithm, a machine learning model or artificial intelligence algorithm.

10. The system according to claim 1, wherein the at least one image capturing device is a microscopy device.

11. A method for processing imaging data into hyperimages, comprising:

capturing imaging data of a specimen by at least one image capturing device, the at least one image capturing device controllable by at least one control computer, displaying the imaging data on a display of the at least one control computer, on premise computer, or remote computer, retrieving a first of at least one data stream, which comprises the screen capture, from the at least one control computer while the at least one control computer is displaying imaging data captured by the at least one image capturing device, and processing at least the screen capture of the first data stream with at least one algorithm to construct a hyperimage.

12. The method according to claim 11, further comprising:

serving remotely-executable instructions to the at least one control computer to retrieve the screen capture.

13. The method according to claim 12, wherein the remotely-executable instructions are served through a web-based application.

14. The method according to claim 11, wherein the screen capture comprises at least part of a display of the at least one control computer, and wherein the display comprises at least one of a physical display and a virtual display the at least one control computer.

15. The method according to claim 11, wherein the at least one data stream is a plurality of data streams, and a second of the plurality of data streams comprises previously recorded display information retrieved from a storage device, and wherein the plurality of data streams are rendered consistent by applying at least one of: time shifting; time scaling; and latency correction to one or more of the plurality of data streams.

16. The method according to claim 11, wherein the at least one algorithm is configured as a computer vision algorithm which is executable on a graphical processing unit (GPU) enabled device.

17. The method according to claim 16, wherein the machine learning algorithm is a convolutional neural network or vision transformers.

18. The method according to claim 16, wherein the machine learning algorithm is an approximation of a convolutional neural network.

19. The method according to claim 11, wherein a fourth of the plurality of data streams is the hyperimage.

20. An edge computing device for processing imaging data into hyperimages, comprising:

a parallelized computing processor for processing at least one data stream with at least one inference model to construct a hyperimage, wherein the edge computing device is networked with a control computer which is configured to operate at least one image capturing device, wherein the edge computing device is configured to retrieve a first of the at least one data stream while the at least one control computer is displaying imaging data captured by the at least one image capturing device, wherein the first of the at least one data stream comprises a screen capture of the at least one control computer, wherein the screen capture is processed by the at least one inference model in constructing the hyperimage.

* * * * *